P. H. BRACE.
ARC WELDING ELECTRODE.
APPLICATION FILED MAY 12, 1919.

1,363,636. Patented Dec. 28, 1920.

Welding Metal as Iron.

Alkaline Earth Metal as Calcium

WITNESSES:
J. B. Merrill
W. H. Woodman

INVENTOR
Porter H. Brace
BY
Charley G. Carr
ATTORNEY

UNITED STATES PATENT OFFICE.

PORTER H. BRACE, OF PITTSBURGH, PENNSYLVANIA, ASSIGNOR TO WESTINGHOUSE ELECTRIC & MANUFACTURING COMPANY, A CORPORATION OF PENNSYLVANIA.

ARC-WELDING ELECTRODE.

1,363,636.     Specification of Letters Patent.     Patented Dec. 28, 1920.

Application filed May 12, 1919. Serial No. 296,571.

*To all whom it may concern:*

Be it known that I, PORTER H. BRACE, a citizen of the United States, and a resident of Pittsburgh, in the county of Allegheny and State of Pennsylvania, have invented a new and useful Improvement in Arc-Welding Electrodes, of which the following is a specification.

My invention relates to electrodes for arc welding purposes and more particularly to metallic electrodes and it has, for its primary object, the provision of a composite metallic electrode of such character as to insure formation of better and stronger welds.

It has been found that welds produced by the employment of metallic-electrode arc welding processes are very frequently brittle owing to the presence in the deposited metal, forming the weld, of inclusions of oxidization products formed during the period of fusion of the metal. The contaminating compounds are supposed to be oxids and nitrids. I propose to overcome this objection by combining, with the welding metal, a material capable of reacting with both oxygen and nitrogen more actively than the welding metal and capable of forming, with them, stable compounds which are readily fusible and which, consequently, will not enter into the weld but will float upon the fused metal as slags.

A number of metals and metallic compounds are well suited for this purpose, among them being the alkaline-earth metals and, more noticeably, calcium and magnesium which react vigorously with both oxygen and nitrogen to form stable compounds. Aluminum is also well suited for this purpose and I have further found that certain compounds of aluminum, as well as certain compounds of the alkaline-earth metals, may be employed. For instance, I may employ carbids of calcium, magnesium or aluminum. Furthermore, any combination of two or more of the foregoing materials may be used, if desired, as they are substantial equivalents for the purpose intended.

Figure 3:
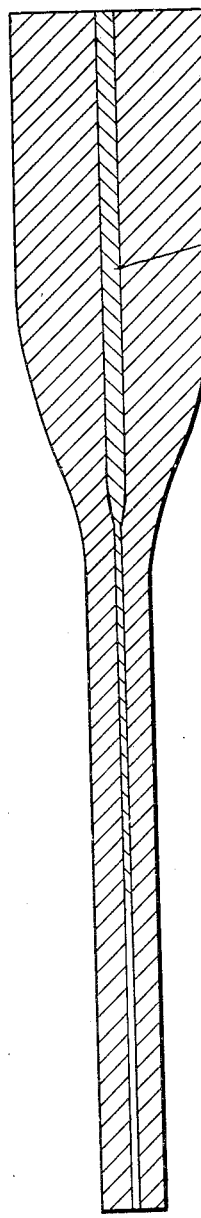
Figure 4:
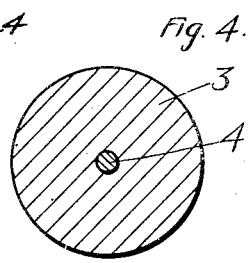
Figure 5:
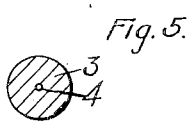
Figure 1:
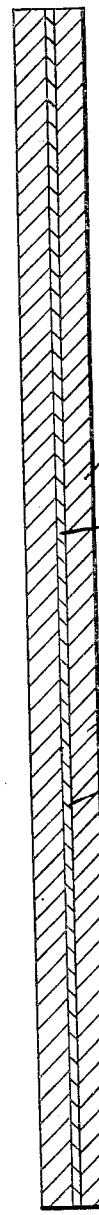
Figure 2:
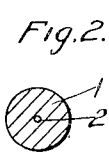

In the drawing, which discloses one embodiment of my invention, Figures 1 and 2 are longitudinal and transverse sections, respectively, of a composite electrode suitable for arc-welding purposes, Fig. 3 is a longitudinal section and Figs. 4 and 5 are transverse sections illustrating a method of forming an electrode, such as that shown in Fig. 1.

It is impracticable to alloy metallic calcium or magnesium with iron, and a coating of these metals would deteriorate in storage or else be oxidized for some distance back from the arc during the welding process and so become ineffective. I have thus found that it is advisable, if not necessary, to inclose the more active protective metal or metals in a gas-tight sheath or tube of the welding metal, and I have illustrated an electrode so formed in Figs. 1 and 2 in which I have shown an iron electrode 1 formed with a core 2 of calcium.

Of course, any suitable welding metal may constitute the main body of the electrode and any of the various metals or metallic compounds previously set forth may be employed in forming the core. Furthermore, the relative sizes of the sheath or covering of welding metal and of the core may be varied with different metals employed, and to suit different circumstances. I have found, however, that a core of approximately one-tenth of the diamter of the composite electrode is very satisfactory for most purposes.

Any suitable means may be employed for forming my composite electrode but I prefer to practice the process illustrated in Figs. 3 to 5, inclusive, of the drawings and fully disclosed in a copending application filed by me Jan. 16, 1919, Serial No. 271,548, Case No. 6723, and relating to a process of making seamless tubing.

As reference may be had to the above-referred-to case, only a brief description of the process will be here given. Broadly speaking, the process comprises forming an ingot or rod of any suitable welding metal, such as iron, with an axial cavity throughout its length. This cavity is then filled with a core of a suitable deoxidizing and arc-stabilizing element or compounds or a mixture of such elements or compounds, after which the composite ingot thus provided is forged or otherwise treated to elongate it and reduce its diameter. Under such treatment, the relative diameters of the core and of the ingot, as a whole, will remain constant, as is well illustrated in Figs. 3 to 5 of the drawings in which 3 indicates the welding metal and 4 the deoxidizing and arc-stabilizing element.

As will be apparent by practising this method, a composite rod or electrode may be formed of any desired welding metal and any desired deoxidizing and arc-stabilizing element or elements, the former constituting a gas-tight sheath about the latter.

Composite metallic electrodes constructed in accordance with my invention may be employed in identically the same manner as the usual metallic electrodes in arc-welding but with far better results, as the material of the inclosed core will react vigorously with any oxygen and nitrogen present during the welding process and will, therefore, prevent the formation of oxids or nitrids of the welding metals and will tend to destroy any such compounds which may be already formed.

As numerous welding metals may be employed, as well as a considerable number of different deoxiding and arc-stabilizing elements and as the electrodes may be formed by processes other than that here set forth, I reserve the right to make any changes which may come within the scope of the appended claims.

I claim as my invention:

1. An arc welding electrode comprising a sheath of welding metal inclosing a core of an alkaline-earth metal.
2. An arc welding electrode comprising a sheath of welding metal inclosing a core of calcium.
3. An arc welding electrode comprising a sheath of welding metal inclosing a core of magnesium.
4. An arc welding electrode comprising a sheath of welding metal inclosing a core of aluminum.
5. An arc welding electrode comprising a sheath of welding metal inclosing a core of metals of the alkaline earth group.
6. An arc welding electrode comprising a sheath of welding metal inclosing a core of at least one of the following: calcium, magnesium and aluminum.
7. An arc welding electrode comprising a sheath of welding metal inclosing a core of at least one of the following: calcium, magnesium, aluminum and the carbids thereof.

In testimony whereof, I have hereunto subscribed my name this 29th day of April, 1919.

PORTER H. BRACE.